May 13, 1947.                    R. L. HALL                    2,420,313
                        FLUID PRESSURE CONTROL VALVE
                           Filed Aug. 18, 1944            2 Sheets-Sheet 1
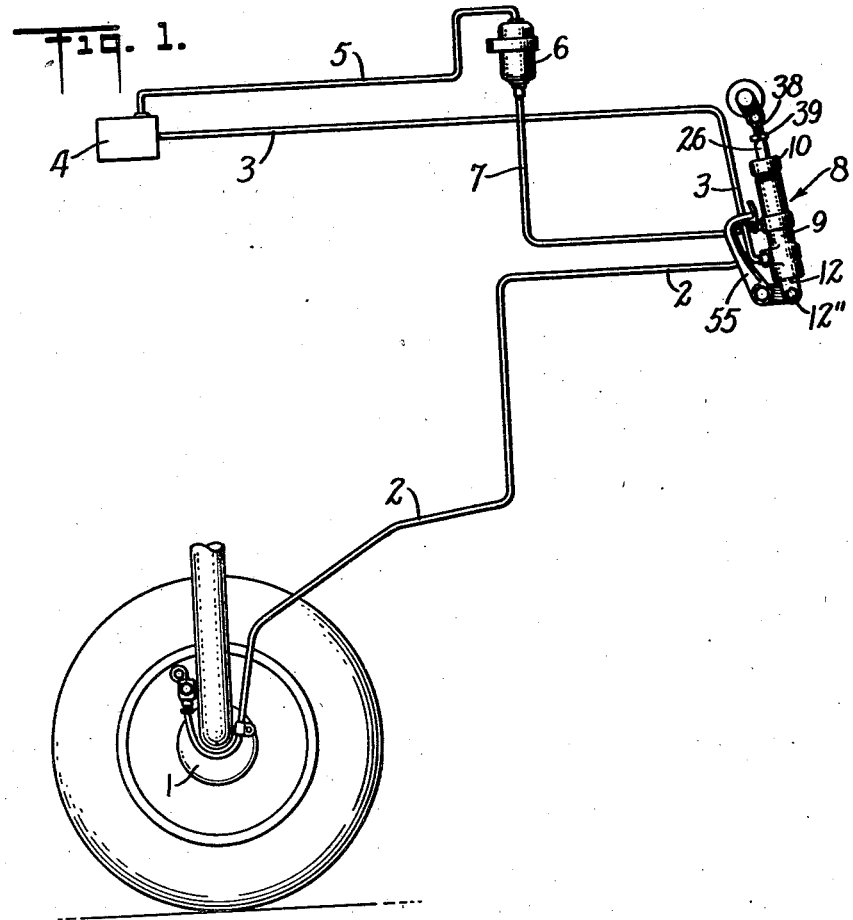
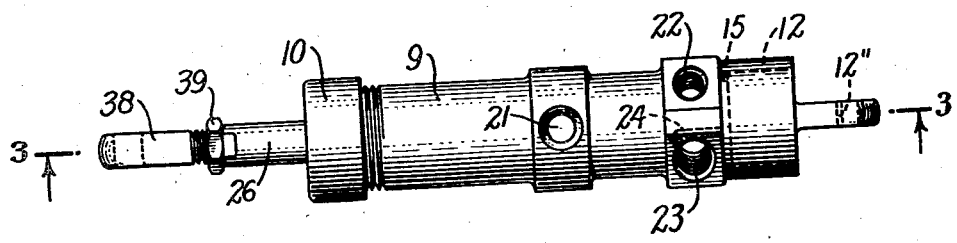
INVENTOR
Robert L. Hall
BY
ATTORNEYS

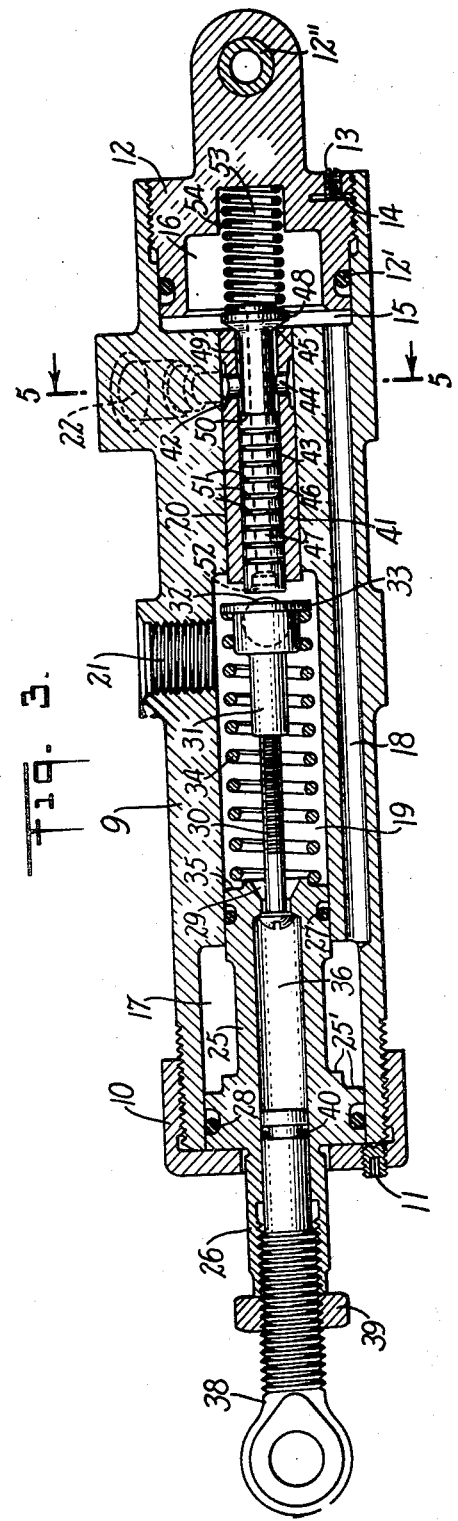

Patented May 13, 1947

2,420,313

UNITED STATES PATENT OFFICE 2,420,313

FLUID PRESSURE CONTROL VALVE

Robert L. Hall, Huntington, N. Y., assignor to Grumman Aircraft Engineering Corporation, Bethpage, N. Y., a corporation of New York Application August 18, 1944, Serial No. 550,116

7 Claims. (Cl. 303—54)

My invention relates to the control of and admission of fluid pressure from a pressure source to a device or mechanism that is to be operated by the pressure fluid wherein fluid at variable pressures is admitted from the pressure source to the device or mechanism and wherein the flow is resisted by a force created by the pressure fluid, which force is approximately directly proportional to the operating force.

The principal object of the invention is to provide means for controlling the flow of fluid under pressure from a source of supply to a device or mechanism that is to be operated by the fluid pressure wherein the variable pressure values of the controlled fluid are indicated by the sense of touch to the operator of the controlling means.

I have found the invention to be admirably adapted for use in controlling the application of fluid pressure operated aeroplane brakes, but it is to be understood that its use is not so limited.

In such an application, a force that is approximately directly proportional to the force that is exerted upon the brakes and that is derived from the same pressure fluid, resists the movement of the brake control so that the operator will, by his sense of touch alone, be informed of the value of the pressure exerted upon the brake mechanism. This, of course, is particularly valuable because the directional control of an aeroplane while under way on the ground, either in landing or in taking off, is effected by the brake mechanism, as the direction of travel of the aeroplane on the ground is controlled, to a great extent, by the application of a brake to one or more of the wheels.

With the instant invention incorporated in the brake mechanism of an aeroplane it is possible for a human operator, who will hereinafter be referred to as the pilot, to feel the degree of brake application to one or more of the wheels.

In the drawings I have illustrated the application of my invention to the brake mechanism of one aeroplane wheel, but it is to be understood that when the invention is used in such an application, each wheel may be provided with an independent system embodying this invention so that each of the wheel brakes may be independently operated and controlled.

In the drawings:

Figure 1 is a diagrammatic view of a fluid pressure braking system incorporating my invention;

Figure 2 is an outside elevational view of the brake valve;

Figure 3 is a longitudinal sectional view through the brake valve on line 3—3 of Figure 2;

Figure 4 is a diagrammatic sectional view of a portion of said brake valve exposing parts obscured in Figure 3; and Figure 5 is a transverse section on line 5—5 of Figure 3.

Describing the embodiment of the invention when incorporated in an aeroplane brake applying system, and referring particularly to Figure 1, a conventional pressure fluid operated brake 1 is operated by the pressure fluid in the conduit 2. This pressure fluid is supplied through a conduit 3 from a pressure source 4, such as an engine operated pump, which receives the fluid through a conduit 5 from a reservoir 6 that in turn is connected to the system by a conduit 7.

The pressure value at the pressure source 4 need not be constant. It may be variable. It is, of course, preferable that the pressure value at the source 4 remain higher than the pressure value that it is desired to admit to the system, but it is important that it be no lower than said value.

A power brake valve 8, which embodies features of the instant invention, is interpolated in the above described circulatory system, and comprises a body portion 9 which is provided with a series of axial chambers and passageways later to be described. One end of the body portion 9 is closed by a cap 10 which is shown in screw-threaded engagement with the body portion and is held in such position by a lock screw 11.

The opposite end of the body portion 9 is closed by an end fitting 12 which is shown in threaded engagement with the adjacent end of the body portion and is maintained in position by a co-operating screw 13 and slot 14. This end fitting may be sealed by an annular member 12' of resilient material, preferably having a circular cross section hereinafter referred to as an O-seal, and extends into a recess 15 of the body portion to a predetermined extent for a purpose which will later be described. This end fitting 12 is provided with a chamber 16 which, with a portion of the recess 15 of the body portion 9, forms a composite chamber 15—16. The opposite end of the body portion 9 is provided with a chamber 17 which has constant communication with the chamber 15—16 through a passageway 18. The body portion 9 is also provided with a bore 19 and a bore 20, which communicate with each other and extend coaxially longitudinally of the body portion from the chamber 17 to the chamber 15—16. A fluid return port 21, with which the conduit 7 to the reservoir 6 is connected, establishes communication between the bore 19 and the reservoir. A port 22, with which the conduit 3 is connected, which conduit extends to the pressure source 4, establishes communication between the pressure source 4 and the bore 20. A port 23 which is connected to the brake mechanism 1 through the conduit 2 establishes communication between the conduit 2, the chambers 15—16 and 17 and the passageway 18 through a port 24.

A piston 25, having an extension 26 protruding through and beyond the cap 10, is mounted to be longitudinally movable within the chamber 17 and the bore 19, which bore 19 is sealed from the chamber 17 by an O-ring 27. The chamber 17 is sealed from the outside by a O-ring 28.

The piston 25 is provided within the chamber 17 with faces 25' which provide a differential pressure area responsive to pressure in the chamber 17 to resist the movement of the piston under the influence of the force applied by the operator. The effective area of the faces being constant, the total reactive pressure will bear a fixed relation to the pressure in the chamber 15—16. The effective area is determined by subtracting the area of the bore 19 from the area of the bore 17.

At its inner end the piston 25 is provided with an axial opening 29.

A spring retainer is mounted within the bore 19 and comprises a rod 30, one end of which extends freely through the opening 29 and the other end of which is in screw threaded adjustable engagement with a ball valve cage 31 in which a ball valve 32 is mounted for free movement in all directions. This cage 31 is provided with a flange 33 against which one end of a coil spring 34 seats. The other end of the coil spring seats against the end 35 of the piston 25. The ball cage 31 and the rod 30 are held in their adjusted positions by a set screw 37 (see Figure 4). An adjustable terminal attachment 38 is in screw threaded engagement with the extension 26 of the piston 25 and is locked in its positions of adjustment by a nut 39. Leakage of oil around the terminal 38 is prevented by an O-ring seal 40.

A tubular valve guide 41 is immovably mounted in the bore 20 and is provided with an external annular groove 42 which has communication with and is adapted to receive oil from the port 22 and, in turn, is connected to the bore 43 of the tubular guide 41 by ports 44.

At the end of the tubular guide adjacent the chamber 15—16 the circular edge that is formed by the intersection of the end face of the guide 41 and the face of the bore thereof acts as a valve seat in the manner which will be later described. This valve seat, although substantially a knife edge, may be slightly honed to insure a positive seating contact.

Within the bore 43 of the valve guide 41 a control valve 46 is slidably mounted. This valve includes a tubular valve stem 46'. The passage 47 through this valve stem 46' extends from end to end thereof to establish communication between the chamber 15—16 and the bore 19. On the end of the valve 46 adjacent the chamber 15—16 a circular poppet valve head 48 is provided which is adapted to seat on the valve seat 45. The area of the effective surface of this poppet valve 48 is relatively small so that the pressure within the chamber 15—16 will exert little force upon the valve to resist its opening.

An annular oil passage 49, which extends longitudinally of the valve stem 46' and is closed at its inner end at 50, establishes communication between the ports 44 and the chamber 15—16 when the poppet valve head 48 is unseated. The area of the surface exposed to the oil pressure at 50 is balanced by the area of that portion of the valve head 48 that is exposed to the oil pressure in passage 49 when the valve head 48 is seated. The flow of oil from the annular passage 49 around the valve stem 46' into the bore 19 is retarded by oil grooves 51 in valve stem 46'. The oil that is entrapped in the grooves not only acts as a seal but also actually creates a bearing having somewhat the action of ball bearings which reduces the friction between the valve stem and the bore to the minimum, thus effectively supporting the valve in a floating condition.

A seat 52 for the ball valve 32 is provided on the end of the valve stem 46' adjacent the ball valve 32 so that the ball valve may close the passage 47.

Within the chamber 15—16 a spring 53, which at one end seats against the poppet valve head 48 and at the other end seats within a seat 54 in the end piece 12, normally urges the poppet valve into its closed or seated position when no opposing pressure is exerted on the valve. This spring is preferably under only sufficient compression to overcome the weight of said valve 46 and move it to its closed position. The force that this spring exerts against the poppet valve head 48 may be adjusted by the adjustment of the end piece 12.

Either the connection 12" of the end piece 12 of the body of the power brake valve or the terminal 38 may be attached to an operated element such as a brake pedal or handle and the other end may be pivotally anchored to the aeroplane structure.

In the drawing I have chosen to show the end piece 12 as attached to and operated by the brake pedal 55 and the terminal 38 as anchored to the aeroplane structure. In the attachment the piston 25 will remain stationary while the body of the valve head moves. If the connection to the aeroplane and to the operating element be reversed so that the terminal 38 is connected to the operating element and the end piece 12 to the aeroplane, the piston will move and the body of the valve will remain stationary. The ultimate operation is the same in either event.

In the first instance it is, of course, desirable to have the conduits 2, 3 and 7 flexible.

Assuming now that the port 22 is subject to line pressure, and no pressure is being exerted on the pedal 55, the parts will be in the positions shown in Figure 3 of the drawings.

Describing now the operation of the valve assembly when interpolated in the system as heretofore set out, when the pilot desires to apply braking action to an aeroplane wheel, he depresses the pedal 55 with a sufficient force, and to a sufficient extent, to permit the establishment of the desired pressure on the brake mechanism from the pressure source 4 through the valve assembly to the brake mechanism by way of the conduits 3 and 2.

Pressure fluid to supply this force to the brake mechanism and to the reaction chamber 17 of the valve assembly is admitted by the valve as follows: Pressure being established at the source 4, the fluid under pressure enters the valve body 9 through the port 22 which is connected to the pressure source by the conduit 3. The fluid under pressure, entering the valve through the port 22, fills the annular groove 42 and the annular passage 49 by way of the ports 44. The fluid under pressure is held in the annular passage 49 in readiness for admission to the brake mechanism by the balanced valve 46. When the pilot applies pressure through the pedal 55 to cause the same to move, the piston 25 and the valve body 9 are caused to telescope, bringing the ball valve 32 into contact with the valve seat 52. Further relative movement of the piston 25, due to increased pedal pressure, will compress the spring 34 to overcome the slight amount of friction existing between the tubular valve 46 and the surface of the bore 43 with which it is in oil sealed contact, and to overcome the compressive force of the spring 53, with the result that the tubular valve 46 will be moved and the poppet valve head 48 unseated. Thus fluid under pressure will be admitted to the chamber 15—16. This pressure fluid flows from the chamber 15—16 through the port 24 which establishes communication between the chamber 15—16 and the port 23, through the port 23 and the conduit 2 to the brake mechanism to cause the operation of the brake mechanism.

The pressure fluid also flows through the passageway 18 from the chamber 15—16 to the chamber 17 where it reacts on the piston face 25', thus reacting through the pedal on the foot of the pilot. A reaction also takes place at the balanced valve 46 against the effective area of the valve. Since this valve 46 has an axial passageway 47 therethrough and a valve seat 52, which is in sealed engagement with the ball valve 32 by reason of the pressure and movement applied to the pedal by the pilot, the fluid pressure reacts on a circular area whose diameter is equal to the entire diameter of the valve stem 46, thus tending to seat the poppet valve head 48 on its seat 45. This force is resisted or balanced, as the case may be, by the caged spring 34, the purpose of this spring 34 being to provide a flexible means of resistance to keep the ball valve 32 in sealed engagement with its seat 52 while the desired fluid pressure in the chamber 15—16 exists. This spring 34 preferably has substantially a straight line rate from an initial compression force, which is preferably just sufficient to overcome the friction existing between the valve 46 and the bore 43 plus the initial compression force imparted to the valve spring 53, to a predetermined force attained by the maximum stroke of the piston 25 integrated in terms of spring force developed by the full piston stroke compression of the spring 34. This maximum spring force is the controlling factor in determining the maximum pressure which may be transmitted to the working mechanism. That is to say, the maximum spring force determines the ultimate movement of the control valve head 48 away from its seat against pressure fluid in chamber 15—16 because the maximum spring force is developed at the end of the stroke of the piston 25.

It is to be understood that if a spring which develops a smaller value of compressive force, is substituted for a given spring 34, the force developed in the spring of smaller value will result in a proportionate decrease in the maximum fluid pressure available to the working mechanism, or on the other hand, if a stiffer spring is substituted, a proportionately greater fluid pressure will be deliverable.

It is, of course, necessary that the pressure at the pressure source be greater than, or equal to the maximum pressure which can be released by the maximum force of spring 34 in order that the above described function may be performed.

The pressure value of the fluid which constantly reacts on the piston face 25', multiplied by the effective piston area, is the force necessary to be overcome by the pedal pressure in order to maintain or increase the fluid pressure applied to the brake, and, because of the direct connection of the chamber 17 with the chamber 15—16 the force that must be overcome by pressure on the pedal is directly proportional to the pressure applied to the brake.

Thus in practical use on an aeroplane brake, the pilot has a complete "feel" of the braking pressure from zero to maximum which makes it possible to overcome the common "over controlling" of the aeroplane brakes and assures the pilot that as long as he can "feel" the brake pressure in terms of pedal pressure he may be assured that he is getting the desired brake action.

On the other hand, if the pilot feels no resistance to the pedal movement or a lesser resistance to the pedal movement than he knows by instruction or experience should be manifested for the designed pressure source, he will be apprised of the fact that the pressure system has been impaired.

It will be realized that as the pressure in the chamber 15—16 reacts against the effective area of the poppet valve head 48 with a tendency to close the valve, this developed force will react through the spring 34 to the pedal and contribute negligibly to the resistance or the force necessary to control the valve against the effect of pressure at the piston. However, as the pedal force is the sum total of the spring pressure and the fluid pressure and each is dependent on the other, the sum of the forces reacting at the pedal is a fixed proportion of the brake pressure.

When the valve head 48 is moved away from its seat by the depression of the pedal, the desired pressure will build up in the system and when such pressure value is reached the valve head 48 automatically will reseat under the influence of the system pressure against the action of the loaded spring 34. If the pilot continues to maintain the pedal in the same position, that is to say, if he exerts no increased force on the spring 34, the valve head 48 will remain closed and the pressure on the brakes will remain constant unless, because of leakage, the pressure drops or because the heat generated at the brakes builds up the pressure. Assuming that neither of these conditions occurs the pressure on the brake will, as stated, remain constant. The pilot may increase the pressure, however, by applying more force to the pedal, in which event the pedal will be further depressed and the valve head 48 will again be unseated to permit additional pressure to reach the brake. When the desired increased pressure value is reached, the valve head 48 will again seat and a static pressure again created. The cycle may be repeated as often as necessary. Of course, should the pilot desire to decrease the applied brake pressure, he may decrease the force on the pedal, with the result that the ball valve 32 will be unseated by the fluid pressure in the chamber 15—16 while the valve 48 remains seated until the desired reduction in pressure has been reached, at which time the ball valve will again seat under the influence of the pedal applied force exerted through the spring 34. This cycle may be repeated as often as necessary.

Should the system pressure in the chamber 15—16 drop as, for instance, because of leakage, and should the pilot continue to maintain the given force on the pedal, the valve head 48 automatically will unseat until the original pressure is again built up, at which time the pressure will again reseat the valve. This cycle automatically will repeat as often as necessary to maintain the pressure desired.

Should the system pressure in the chamber 15—16 build up in value, as for instance because of the heating and expansion of the brake mechanism, and should the pilot continue to maintain the given force on the pedal, the ball valve 32 automatically will unseat to permit pressure leakage until the pressure in the chamber 15—16 reduces to the original given pressure. At this time it automatically will reseat to maintain that given pressure. This cycle automatically will repeat.

Should the pressure at the brake automatically build up, as, for instance, a result of the heat generated due to brake application, such excess pressure will automatically be relieved because it will move the ball valve 32 from its seat against the action of the spring 34, which has been placed under only sufficient compression to admit the desired pressure, with the result that the excess pressure fluid will escape through the port 21 to the storage tank 6.

Although I have described the valve as being operated by a pedal, it is to be understood that it may as well be manually operated for with manual operation the pilot will have the same "feel" as with a pedal operation.

What I claim is:

1. A pressure fluid valve assembly including a pressure fluid inlet, a pressure fluid outlet, a balanced control valve interposed between said inlet and said outlet, a piston chamber having an operator actuated piston, resilient means interposed between said balanced valve and said piston to transmit pressure from the operator to said valve to adjustably open the latter, and additional means for conveying fluid pressure at said outlet to said piston to resist the movement of said piston to open said valve whereby the variation of the pressure at said outlet will be indicated by the sense of "feel" of the operator.

2. A pressure fluid valve assembly having a pressure fluid inlet, a pressure fluid outlet, means for admitting various pressures from said inlet to said outlet, operating means for regulating fluid outlet pressure, actuating means responsive to said operating means for operating said admission means to maintain a desired pressure at said outlet, and means for applying to said operating means as a resisting force and independently of said actuating means a proportional part of the pressure at said outlet.

3. A pressure fluid valve assembly having a pressure fluid inlet, a pressure fluid outlet, means for adjusting flow of pressure fluid from said inlet to said outlet, means operable directly against a proportional part of the pressure at said outlet and independently of said adjusting means to operate said adjusting means to establish a desired pressure at said outlet, and pressure responsive means to prevent the development of pressures in excess of that desired.

4. A pressure valve assembly having a pressure fluid inlet, a pressure fluid outlet, and valve means adjustable to maintain desired pressure at said outlet, an operating member for said valve and displaceable to regulate the pressure maintained thereby, and means for applying to said operating member a resisting force proportional to pressure at said outlet independently of and in addition to resistance of said valve means to displacement of said operating member.

5. In a pressure fluid valve assembly and in combination, a chamber having a pressure fluid inlet and a pressure fluid outlet, adjustable means for maintaining desired pressure within said outlet, an operating member, actuating means operated by said operating member for adjusting said adjustable means to regulate pressure within said outlet, and means for applying to said operating member in addition to and independently of reaction of said actuating means against said control member a resisting force corresponding to fluid pressure in said outlet, whereby the variation of pressure at said outlet will be indicated by the "feel" of the operating member to an operator.

6. In a pressure fluid valve assembly and in combination, a pressure fluid chamber having a pressure fluid inlet and a pressure fluid outlet, adjustable valve means for maintaining desired pressure within said outlet, an operating member, actuating means operated by said operating member for adjusting said valve means to regulate pressure within said inlet, and means for applying to said operating member in addition to and independently of reaction of said actuating means against said control member a resisting force corresponding to fluid pressure in said outlet, whereby the variation of pressure in said outlet will be indicated by the "feel" of the operating member to an operator.

7. In a pressure fluid valve assembly and in combination, a chamber having a pressure fluid inlet and a pressure fluid outlet, adjustable valve means for maintaining desired pressure within said chamber, an operating member, actuating means operated by said operating member for adjusting said valve means to regulate pressure within said chamber, and pressure fluid actuated means in communication with said outlet for applying to said operating member in addition to and independently of reaction of said actuating means a resisting force corresponding to fluid pressure in said outlet, whereby the variation of pressure in said outlet will be indicated by the "feel" of the operating member to an operator.

ROBERT L. HALL.

REFERENCES CITED

The following references are of record in the file of this patent:

UNITED STATES PATENTS

| Number | Name | Date |
|---|---|---|
| 1,676,980 | Christensen | July 10, 1828 |
| 2,324,690 | Gardiner et al. | July 20, 1943 |
| 2,347,321 | Huber | Apr. 25, 1944 |
| 2,137,954 | Sanford et al. | Nov. 22, 1938 |
| 1,757,259 | Mitton | May 6, 1930 |
| 2,375,110 | Hufferd | May 1, 1945 |
| 2,331,800 | Rockwell | Oct. 12, 1943 |

Certificate of Correction

Patent No. 2,420,313.                                             May 13, 1947.

ROBERT L. HALL

It is hereby certified that error appears in the printed specification of the above numbered patent requiring correction as follows: Column 8, line 30, claim 6, for the word "inlet" read *outlet*; and that the said Letters Patent should be read with this correction therein that the same may conform to the record of the case in the Patent Office.

Signed and sealed this 1st day of July, A. D. 1947.

[SEAL]

LESLIE FRAZER,
*First Assistant Commissioner of Patents.*